(12) United States Patent
Tsirkin et al.

(10) Patent No.: US 12,367,059 B2
(45) Date of Patent: Jul. 22, 2025

(54) EFFICIENT MEMORY SWAP FOR VIRTUAL MACHINES

(71) Applicant: Red Hat, Inc., Raleigh, NC (US)

(72) Inventors: Michael Tsirkin, Yokneam Illit (IL); Andrea Arcangeli, Mineola, NY (US)

(73) Assignee: Red Hat, Inc., Raleigh, NC (US)

( * ) Notice: Subject to any disclaimer, the term of this patent is extended or adjusted under 35 U.S.C. 154(b) by 503 days.

(21) Appl. No.: 17/851,669

(22) Filed: Jun. 28, 2022

(65) Prior Publication Data

US 2023/0418644 A1    Dec. 28, 2023

(51) Int. Cl.
*G06F 9/455* (2018.01)
*G06F 12/02* (2006.01)

(52) U.S. Cl.
CPC ...... *G06F 9/45558* (2013.01); *G06F 12/0223* (2013.01); *G06F 2009/45583* (2013.01); *G06F 2212/152* (2013.01)

(58) Field of Classification Search
CPC ............ G06F 9/45558; G06F 12/0223; G06F 2009/45583; G06F 2212/152
See application file for complete search history.

(56) References Cited

U.S. PATENT DOCUMENTS

| 2015/0212845 A1* | 7/2015 | Tsirkin | G06F 9/45558 711/114 |
| 2018/0150232 A1* | 5/2018 | Tsirkin | G06F 9/45558 |
| 2019/0369903 A1 | 12/2019 | Tsirkin | |
| 2021/0342260 A1 | 11/2021 | Tsirkin | |

\* cited by examiner

*Primary Examiner* — Wissam Rashid
(74) *Attorney, Agent, or Firm* — Womble Bond Dickinson (US) LLP (57) ABSTRACT

Systems and methods for enhancing efficient memory swap for virtual machines. An example method may comprise: receiving, by a hypervisor running on a host computer system, a request, from a virtual machine managed by the hypervisor, to write to a virtual disk a content of a memory page identified by a guest physical address (GPA); detecting, by the hypervisor, that the content of the memory page is stored on a storage device; storing, on the virtual disk, an identifier of a location of the content of the memory page on the storage device; and un-mapping the GPA from the storage device.

20 Claims, 6 Drawing Sheets

EFFICIENT MEMORY SWAP FOR VIRTUAL MACHINES

TECHNICAL FIELD

The present disclosure is generally related to virtualization in a computing environment, and more particularly, to virtualization technology that enhances memory swap efficiency for virtual machines.

BACKGROUND

Virtualization allows multiplexing of an underlying host machine between different virtual machines. The virtualization is commonly provided by a hypervisor (e.g., virtual machine monitor (VMM)) and enables the hypervisor to allocate a certain amount of a host system's computing resources to each of the virtual machines. Each virtual machine is then able to configure and use virtualized computing resources (e.g., virtual processors) to execute executable code of a guest operating systems. A host machine can accommodate more virtual machines than the size of its physical memory allows, and give each virtual machine the impression that it has a contiguous address space, while in fact the memory used by the virtual machine may be physically fragmented and even overflow to disk storage.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Device and input/output (I/O) virtualization involves managing the routing of I/O requests between virtual devices and the shared physical hardware.

Memory virtualization may be implemented by employing a page table (PT), which is a memory structure translating virtual memory addresses to physical memory addresses. In a virtualized environment, reclaiming a memory page assigned to a virtual machine may involve paging the content of the memory page to a backing store before reallocating the memory page to fulfill a request for memory resources. Memory pages can be selected for swapping out based on certain heuristics, e.g., based on the access frequency, most recent access time, etc. Accordingly, in certain situations, the hypervisor and the virtual machine may select the same memory page for swapping out, which may lead to undesired consequences, such as disk access storms. For example, if both the host and the virtual machine decide to swap out the same page, then the virtual machine may request the hypervisor to send to the virtual disk a page that has just been swapped out by the host, thus causing the host to read the page back from the host disk in order to write it to the virtual disk immediately thereafter.

Aspects of the present disclosure address the above and other deficiencies by providing technology that eliminates unnecessary disk access operations in swapping out virtual machine memory pages. An example method may involve using the location of the content of a given memory page stored in a storage device that is used as a backing store instead of reading the content into the memory when the page is being swapped out. When a virtual machine managed by the hypervisor attempts to allocate additional memory, the virtual machine may decide that a memory page can be swapped to a virtual disk so that the memory page can be used for other task(s). The virtual machine may then send a request, to the hypervisor, to swap the memory page out to the virtual disk. The hypervisor may use the information received in the request, for example, a guest physical address that identifies the memory page, to determine whether the memory page has already been swapped by the hypervisor. If that is the case, the hypervisor may, instead of reading the content of the page into the physical memory, store, on the virtual disk, an identifier of the location of the content of the memory page in the storage device. Thus, an access request for the content in the virtual disk would reference the content stored in the storage device, without requiring that the content be actually copied to the virtual disk. Thereafter, the hypervisor may un-map the guest physical address (GPA) of the memory page from the storage device and mark the page as not present in the physical memory. A subsequent access by the virtual machine would result in a page fault, which will be resolved by allocating a new memory page without reading the data from the disk. This enables hypervisor to reallocate physical memory pages in a more efficient manner.

The systems and methods described herein include technical improvements to virtualization technology. In particular, aspects of the present disclosure may enhance the ability of the hypervisor and the virtual machine to perform efficient memory management. In one aspect, the present disclosure may enable the hypervisor and the virtual machine to more efficiently deal with additional storage request when a memory page has been swapped by the hypervisor before the virtual machine attempts to swap the same memory page and to take actions to enhance the operation of the virtualized environment. In another aspect, the present disclosure may enable the actions to be performed by the hypervisor and the virtual machine in a more resource efficient manner. In one example, memory swap by the virtual machine may be performed by the hypervisor using location information of content of the memory page being stored in a storage device instead of copying the actual content. This is specifically true because using the location information does not rely on the content being compressible, which reduces the data amount of I/O operations. In yet another aspect, the present discourse may also reduce the number of I/O operations in that two steps of reading the content into the memory and then writing the content into the virtual disk are reduced to one step of writing location information into the virtual disk. Enhancing the ability and efficiency of the hypervisor and the virtual machine for memory management may improve the virtualization technology. The enhancement may enable a computing system to reduce the amount of computing resources consumed by a set of virtual machines or enable the computing system to support an increased number of virtual machines using the same amount of computing resources.

Aspects of the present disclosure may also enhance the support of user space drivers and nested virtualization which further optimize the performance, security, and efficiency of a host computer system. Nested virtualization may also benefit by the technology disclosed herein and typically involves a host machine that provides multiple layers of virtualization. The multiple layers may include one or more hardware virtualization layers (e.g., virtual machines), operating system virtualization layers (e.g., containers), other virtualization layers, or a combination thereof. For example, a top level virtual machine may be executed within a lower level virtual machine and the lower level virtual machine may be managed by a hypervisor. The enhanced efficient memory swap including using location information discussed herein may enable the top level virtual machine to directly signal (e.g., expose to) the hypervisor without signaling the lower level virtual machine (e.g., skip the intermediate virtual machine).

Various aspects of the above referenced methods and systems are described in details herein below by way of examples, rather than by way of limitation. The examples provided below discuss the technology above applied to a host machine that implements hardware virtualization. In other examples, the technology discussed herein may be applied generally to enable a user space driver to use a communication channel to interact with a kernel of a machine and the machine may or may not provide hardware level virtualization. Therefore, the systems and methods described herein represent improvements to the functionality of general purpose or specialized computing devices operating a virtualized environment with one or more virtual processors.

Figure 1:
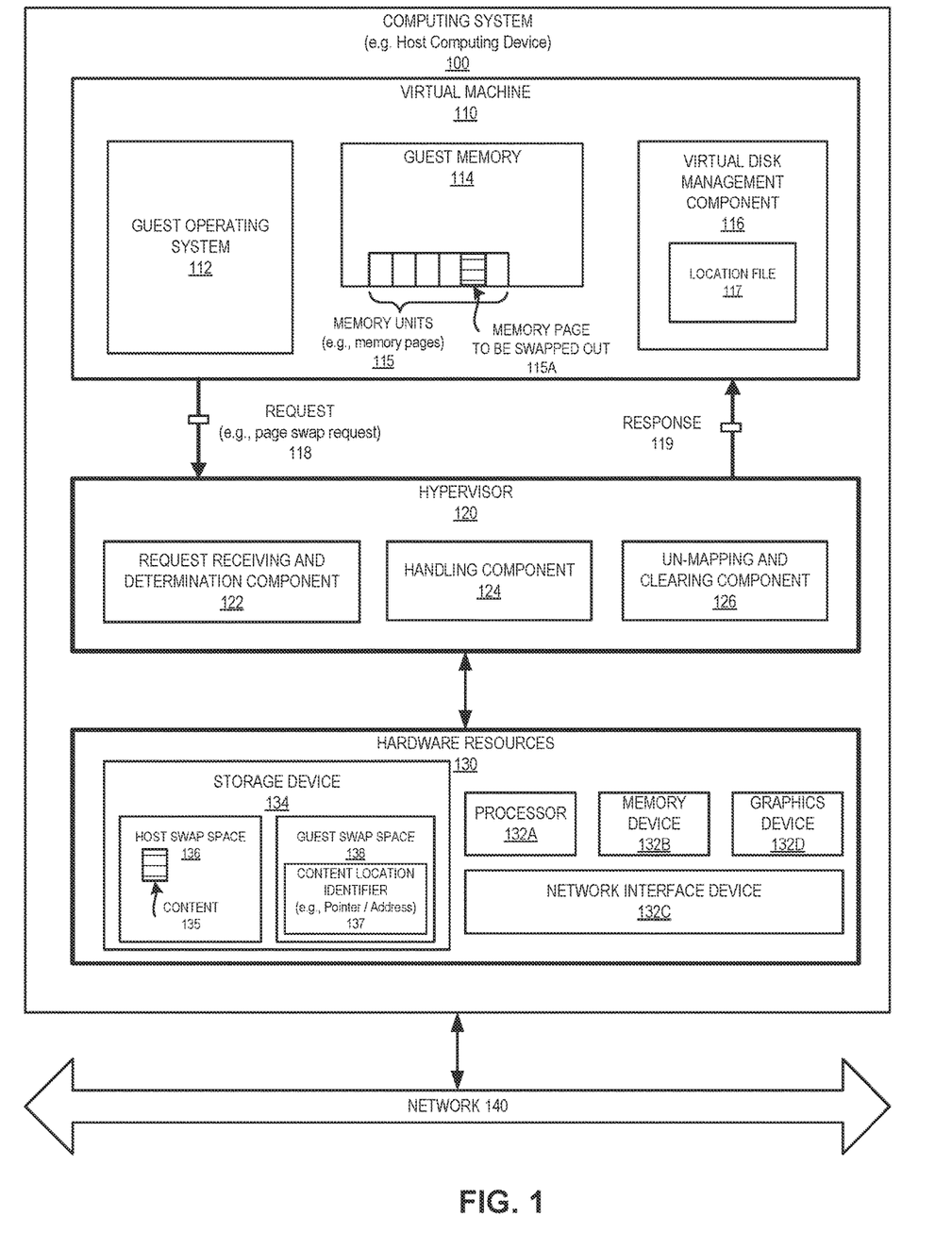
FIG. 1 depicts a high-level block diagram of an example computing system that enables enhancing memory swap efficiency for virtual machines, in accordance with one or more aspects of the present disclosure.

FIG. 1 depicts an illustrative architecture of elements of a computing system 100, in accordance with an embodiment of the present disclosure. Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware. In another example, computing system 100 may be a computing device implemented with PowerPC®, SPARC®, or other hardware. In the example shown in FIG. 1, computing system 100 may include a virtual machine 110, a hypervisor 120, hardware resources 130, and a network 140.

Virtual machine 110 may execute guest executable code that uses an underlying emulation of physical resources. Virtual machine 110 may support hardware emulation, full virtualization, para-virtualization, operating system-level virtualization, or a combination thereof. The guest executable code may include guest operating system 112, a guest application, guest device drivers, etc. Virtual machine 110 may execute one or more different types of guest operating system, such as Microsoft®, Windows®, Linux®, Solaris®, etc. Virtual machines 110 may execute guest operating system 112 that manage guest memory 114.

Guest operating systems 112 may manage aspects of guest memory caching, such as the allocation and the release of portions of guest memory 114. Guest storage 114 may be data storage that is allocated by hypervisor 120 for use by virtual machine 110. Guest memory 114 may be any virtual memory, logical memory, physical memory, other portion of memory, or a combination thereof for storing, organizing, or accessing data. Guest memory 114 may be managed by guest operating system 112 and may be segmented into memory units 115 (e.g., guest memory pages). Memory units 115 may be logical or physical units of data storage for storing, organizing, or accessing data. Memory units 115 may each include a contiguous or non-contiguous sequence of bytes or bits and may have a page size that is the same or different from a memory page size used by hypervisor 120. In one example, a memory unit may be a virtual representation of underlying physical storage units, which may be referred to as physical storage units. Memory units 115 may have a unit size that is the same or different from a physical block size provided by an underlying hardware resource. The block size may be a fixed-size, such as a particular integer value (e.g., 4 KB, 4 MB, 1 GB) or may be a variable-size that varies within any range of integer values.

Memory units 115 may include volatile and non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, memory units 115 may be a memory segment and each memory segment may correspond to an individual memory page, multiple memory pages, or a portion of a memory page. In the example shown in FIG. 1, memory units 115 may include a memory page that is to be swapped out 115A.

Guest operating system 112 may provide instructions to hypervisor 120 regarding additional storage and receive responsive instructions from hypervisor 120. In one example, guest operating system 112 may send a request 118 to hypervisor 120 and receive a response 119 from hypervisor 120 regarding swapping of a memory page. Guest operating system 112 may generate request 118 for swapping of a memory page associated with virtual machine 110. Request 118 may be an instruction that execute as part of a respective virtual machine process and causes the hypervisor to perform a particular task. Request 118 may include one or more instructions, commands, calls, operations, operands, parameters, or a combination thereof.

As shown in FIG. 1, page swap request 118 may be an instruction of guest operating system 112 to hypervisor 120. Page swap request 118 may reference a memory page and a virtual disk to cause the hypervisor to swap the content of the memory page to the virtual disk. Page swap request 118 may include an identifier of the memory page (e.g., a guest physical address (GPA)), an identifier of the virtual disk, and a notification indicating that the memory page will not be used by the virtual machine after swapping.

Virtual machine 110 may include a virtual disk management component 116 for managing guest swap files associated with virtual machine 110. As shown in FIG. 1, virtual disk management component 116 may include a location file 117. Location file 117 may include a table that links an identifier of location of host swap space to an identifier of guest swap space (e.g., a table entry having content location identifier 137 associated with an identifier of the virtual disk). Location file 117 may store data that guest operating system 112 can reference when executing instructions regarding guest swap space. Location file 117 may store all location identification data (e.g., content location identifier 137) as described below. In one example, location file 117 may be updated before, during, or after executing request 118. In one example, content location identifier 137 stored in location file 117 may consume all of the data storage or a portion of the data storage provided by location file 117.

Hypervisor 120 (also known as a virtual machine monitor (VMM)) may provide one or more virtual machine 110 with direct or emulated access to hardware resources 130. In the example shown, hypervisor 120 may run directly on the hardware of computing system 100 (e.g., bare metal hypervisor). In other examples, hypervisor 120 may run on or within a host operating system (not shown). Hypervisor 120 may manage system resources, including access to hardware resources 130. Hypervisor 120, though typically implemented as executable code, may emulate and export a bare machine interface to higher-level executable code in the form of virtual processor and data storage (e.g., guest memory). Higher-level executable code may comprise a standard or real-time operating system (OS), may be a highly stripped down operating environment with limited operating system functionality and may not include traditional OS facilities, etc. Hypervisor 120 may support any number of virtual machines (e.g., a single VM, one hundred VMs, etc.).

As shown in FIG. 1, hypervisor 120 may include a request receiving and determination component 122, a handling component 124, and an un-mapping and clearing component 126. The components discussed herein are purely logical, and one or more components can be implemented by one or more hardware and/or one or more software modules.

Components 122, 124, and 126 may enable hypervisor 120 to communicate with virtual machine 110A-C regarding a request to swap to a virtual disk a memory page by virtual machine 110. Components 122, 124, and 126 may enable hypervisor 120 to identify a location of content of the memory page that has been already swapped by hypervisor 120 to a storage device 130 and store the location identification information on a virtual disk without swapping in the content. Components 122, 124, and 126 may enable hypervisor 120 to un-map the memory page from the storage device so that a subsequent access to the memory page by the virtual machine would result in a page fault, which will be resolved by allocating a new memory page without reading the data from the disk. Components 122, 124, and 126 may be separated into one or more components or may be included within the same component. Request receiving and determination component 122 may enable the hypervisor 120 to receive a request to swap to a virtual disk a memory page and determine whether the memory page has already been swapped out. Handling component 124 may send, to the virtual disk, location identifier 137 of the storage device corresponding to the host swap data 136 that stores content 135 of the memory page referenced by the guest physical address so that there is a linkage between the guest swap data 138 and the host swap data 136. The linkage by using content location identifier 137 is beneficial in that an access request for the referenced content in the guest swap data 138 would reference to content 135 saved in the host swap data 136, without copying content 135 in the host swap data 136 to the guest swap data 138. Handling component 124 may also send respond 119, to virtual machine 110, to indicate that the memory page has been swapped out to the virtual disk. Un-mapping and clearing component 126 may un-map the guest physical address of the memory page from the storage device so that a subsequent access to the memory page by the virtual machine would result in a page fault, which will be resolved by allocating a new memory page without reading the data from the disk, and clear the memory page for new task(s).

As shown in FIG. 1, response 119 may be a confirmation of hypervisor 120 to guest operating system 112 that the memory page has been swapped to the virtual disk as request by virtual machine 110. Response 119 may be optional and may be omitted in some implementations.

Hardware resources 130 may be utilized for performing computing tasks. In one example, one or more of the hardware resources may correspond to a physical device of computing system 100. In another example, one or more of the hardware resources may be provided by hardware emulation and the corresponding physical device may be absent from computing system 100. For example, computing system 100 may be a server machine that does not include a graphics device (e.g., graphics card) or includes a graphics device that does not support a particular hardware feature. Hypervisor 120 may provide the hardware feature of the hardware resource by emulating a portion of the hardware resource (e.g., provide a virtualized graphics device). The emulation of a portion of a hardware resource may be provided by hypervisor 120, virtual machine 110, host operating system (not shown), another hardware resource, or a combination thereof.

In the example shown in FIG. 1, hardware resources 130 may include a processor 132A, a memory device 132B, a network interface device 132C, a graphics device 132D, and a storage device 134, other physical or emulated devices, or combination thereof. One or more of the hardware resources 130 may be combined or consolidated into one or more physical devices or may partially or completely emulated by hypervisor 120 as a virtual device. Processor 132A may refer to devices capable of executing instructions encoding arithmetic, logical, or I/O operations. Processor 132A may be a single core processor, which may be capable of executing one instruction at a time (e.g., single pipeline of instructions) or a multi-core processor, which may simultaneously execute multiple instructions. Memory device 132B may include any data storage that is capable of storing digital data, such as physical memory devices including volatile memory devices (e.g., RAM), non-volatile memory devices (e.g., NVRAM), other types of memory devices, or a combination thereof. Network interface device 132C may provide access to a network internal to the computing system 100 or external to the computing system 100 (e.g., network 140) and in one example may be a network interface controller (NIC). Graphics device 132D may provide graphics processing for the computing system 100 and/or one or more of the virtual machines 110.

Storage device 134 may function as a secondary memory that is used as a backing store and may include mass storage devices, such as solid-state storage (e.g., Solid State Drives (SSD)), hard drives, other persistent data storage, or a combination thereof. Storage device 134 may be any data storage accessible to processor 132A as it executes virtual machine 120. Storage device 134 may include a storage controller associated with one or more mass storage devices that include solid-state storage (e.g., Solid State Drives (SSD)), hard drives, other persistent data storage, or a combination thereof. Storage device 134 may be mapped to logical memory (e.g., guest memory), physical memory (e.g., host physical memory), or a combination hereof. In the example shown in FIG. 1, storage device 134 may include a host swap space 136 and a guest swap space 138. The host swap space 136 may store content 135, which may correspond to contents of a portion of memory assigned by hypervisor 120 to virtual machine 110 and attempted to be swapped by the virtual machine 110. The guest swap space 138 may store content location identifier 137 of the content 135 stored in the host swap space 136, which may include location identification data of the location of content 135 on the storage device 134.

Content location identifier 137 may specify a particular location on storage device 134. Content location identifier 137 may indicate one or more locations in the form of numeric values, alphanumeric values, binary values, other values, or a combination thereof. A location may be a particular point, range, area, region, or other location in storage device 134. Content location identifier 137 may reference the storage location via a value that is an input parameter, output parameter, hardcoded parameter, other parameter, or a combination thereof. Referencing a location may be the same or similar to pointing to the location. In one example, the reference to the location may be a value that functions as a pointer to the location and hypervisor 120 may store a value that functions as a pointer to a memory location (e.g., memory pointer). Therefore, Content location identifier 137 may be described as an identifier, a pointer, a reference, an address, a pointer to a pointer, a reference to a pointer, pointer to a reference, a reference to a reference, other description, or a combination thereof.

Network 140 may be a public network (e.g., the internet), a private network (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
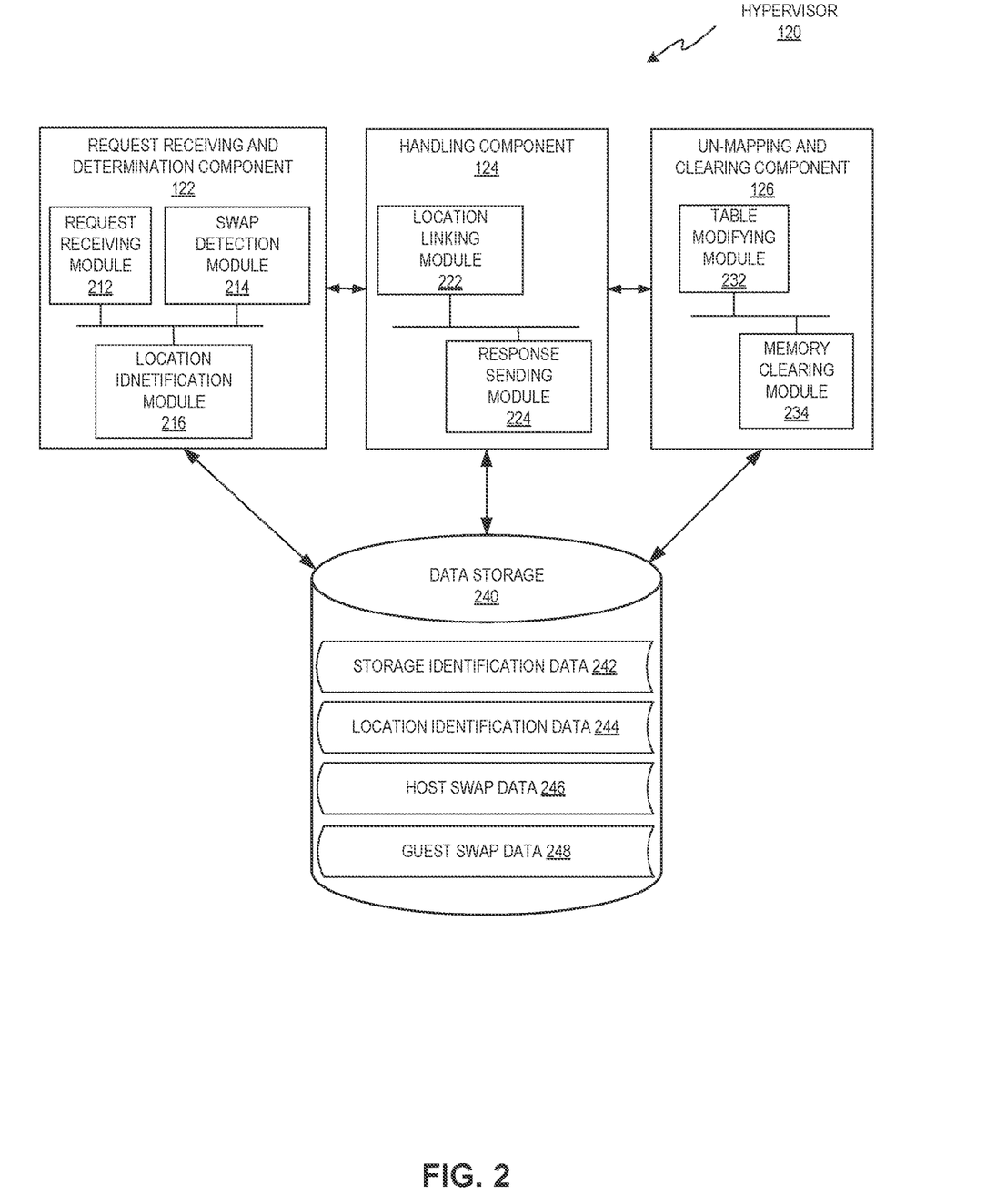
FIG. 2 depicts a block diagram illustrating components and modules of an example hypervisor, in accordance with one or more aspects of the present disclosure.

FIG. 2 depicts a block diagram illustrating an exemplary hypervisor 120 implementing the methods described herein that enhance memory swap efficiency for virtual machines when memory pages have already been swapped out by the hypervisor, in accordance with one or more aspects of the present disclosure. Hypervisor 120 may be the same or similar to hypervisor 120 of FIG. 1 and may include a request receiving and determination component 122, a location component 124, an un-mapping and clearing component 126, and a data store 240. The components and modules discussed herein may be performed by any portion of hypervisor 120 or a host operating system, by any portion of virtual machine or a guest operating system, by other portion of a computing system, or a combination thereof. More or less components or modules may be included without loss of generality. For example, two or more of the components may be combined into a single component, or features of a component may be divided into two or more components. In one implementation, one or more of the components may reside on different computing devices (e.g., a client device and a server device).

Request receiving and determination component 122 may enable the hypervisor 120 to receive a request to swap to a virtual disk a memory page and determine whether the memory page has already been swapped out. In the example shown in FIG. 2, request receiving and determination component 122 may include a request receiving module 212, a swap detection module 214, and a location identification module 216.

Request receiving module 212 may enable the hypervisor 120 to receive a request from a virtual machine that the virtual machine asks to swap a memory page to a virtual disk. The request may include identification data regarding the memory page, identification data regarding the virtual disk, and a notification. The identification data regarding the memory page and the identification data regarding the virtual disk may be stored as storage identification data 242 in data storage 240. Storage identification data 242 may include an offset value (numeric or non-numeric value), an address (virtual, logical, or physical address), a pointer, a link, other data, or a combination thereof. In one example, identification data regarding the memory page may include a guest physical address associated with the memory page. In another example, identification data regarding the memory page may include a storage unit identifier that uniquely identifies the memory page or include data (e.g., offset value) that may be used by hypervisor 120 to determine the storage unit identifier of the memory page. In one example, the identification data regarding the virtual disk may include a pointer point to a storage unit associated with a guest swap space. In one example, the notification may include a flag (e.g., bit) that indicates that a memory page is about to be swapped out by the virtual machine and that the memory page is free to use after swapping.

Swap detection module 214 may enable the hypervisor 120 to detect that the memory page has already been swapped out by hypervisor 120. The detection may involve determining that the content of the memory page is stored in a storage device. In one example, swap detection module 214 may detect that the identification data of the memory page (e.g., guest physical address) is present in a host swap space stored in the storage device. For example, swap detection module 214 may scan the host swap data 246 in the data storage 240 and determine whether there is a match for the guest physical address that indicates the referenced content has been stored. For example, swap detection module 214 may determine, in a host page table, there is a page entry for a memory page identified by a host physical address (HPA) corresponds to the guest physical address. In another example, swap detection module 214 may scan the location identification data 244 in the data storage 240 to determine whether there exists corresponding data, for example, in the metadata described below, that represents the content has already been swapped.

Location identification module 216 may enable the hypervisor 120 to identify the location of the storage device corresponding to the host swap data 246 that stores the referenced content associated with the guest physical address, and store it as location identification data 244 in the data storage 240. In one example, location identification data 244 may be generated and/or stored in the data storage 240 after receiving the request for swapping from the virtual machine and detecting that the memory page has already been swapped out by hypervisor 120. In another example, location identification data 244 may be generated and/or stored in the data storage 240 at the time when the memory page is swapped out by hypervisor 120. In such cases, location identification data 244 may be stored in the data storage 240 along with the content of the memory page as metadata, which may serve as an indication that the memory page referenced by the guest physical address has been already swapped by the hypervisor.

Handling component 124 may enable the hypervisor 120 to send, to the virtual disk, the location of the storage device corresponding to the host swap space that stores the content referenced by the guest physical address (i.e., location identification data 244) so that there is a linkage between the guest swap space (i.e., through guest swap data 248) and the host swap space (i.e., through host swap data 246). The linkage is beneficial in that an access request for the content in the guest swap space would reference to the referenced content saved in the host swap space, without copying the referenced content in the host swap space (i.e., host swap data 246) to the guest swap space (i.e., guest swap data 248). Handling component 124 may also enable the hypervisor 120 to send a respond, to the virtual machine that has sent the request, to indicate that the memory page has been swapped to the virtual disk. In the example shown in FIG. 2, handling component 124 may include a location linking module 222 and a response sending module 224.

Location linking module 222 may enable the hypervisor 120 to store, on the virtual disk, the location of the storage device corresponding to the host swap space that stores the content referenced by the guest physical address (i.e., location identification data 244) so that there is a linkage between the guest swap space (i.e., through guest swap data 248) and the host swap space (i.e., through host swap data 246). In one example, location identification data 244 may include a bitmap, each point of which may correspond to a respective binary flag (e.g., bit) that indicates that the content has already been swapped and a location of the content that has been stored. In another example, location identification data 244 may be an n-dimensional array, linked list, other data structure, or a combination thereof that provides a location of the content that has been stored and the guest physical address of the memory page. Upon the linkage, an access request, by the virtual machine, for the content in the guest swap space would reference to the referenced content saved in the host swap space, without copying the referenced content in the host swap space (i.e., host swap data 246) to the guest swap space (i.e., guest swap data 248).

Response sending module 224 may enable the hypervisor 120 to send a respond, to the virtual machine that has sent the request, to indicate that the memory page has been swapped to the virtual disk. The response may include an indication that the swapping is performed by a way of linkage without reading the content from the storage device. In one example, responding sending module 224 may send the response after the location identification data has been stored on the virtual disk. In another example, responding sending module 224 may send the response after cleaning of the storage mapping as described below so that a fault will not be triggered when the virtual machine sends a request to access the memory page for additional memory.

Un-mapping and clearing component 126 may enable the hypervisor 120 to un-map the memory page from the storage device so that a subsequent access to the memory page by the virtual machine would result in a page fault, which will be resolved by allocating a new memory page without reading the data from the disk. Un-mapping and clearing component 126 may further enable the hypervisor 120 to clear the memory page for new task(s). In the example shown in FIG. 2, un-mapping and clearing component 126 may include a table modifying module 232 and a memory clearing module 234.

Table modifying module 232 may enable the hypervisor 120 to modify or delete a page table entry regarding the guest physical address in a host page table so that a subsequent access to the memory page by the virtual machine would result in a page fault, which will be resolved by allocating a new memory page without reading the data from the disk.

Memory clearing module 234 may enable the hypervisor 120 to access the memory page (or blocks of memory pages) and clear the memory page (or blocks of memory pages). Clearing the memory page may involve overwriting, replacing, resetting, wiping, or zeroing out the data within the storage unit. The clearing may occur before, during, or after the storage unit is allocated to a requesting virtual machine but before the requesting virtual machine can access the content of the storage unit.

Data storage 240 may store storage identification data 242, location identification data 244, host swap data 246, and guest swap data 248. Data store 240 may be any storage portion that is modifiable by hypervisor 120 and may include a storage unit of hypervisor storage. Storage identification data 242 may identify one or more storage units or ranges of storage units. Storage identification data 242 may include an offset value (numeric or non-numeric value), an address (virtual, logical, or physical address), a pointer, a link, other data, or a combination thereof. Location identification data may identify one or more locations of content being stored on one or more storage units or ranges of storage units. Location identification data 244 may include an offset value (numeric or non-numeric value), an address (virtual, logical, or physical address), a pointer, a link, other data, or a combination thereof. Host swap data 246 may include one or more contents being swapped by hypervisor 120 corresponding to one or more memory pages. Guest swap data 246 may include one or more contents being swapped by a respective virtual machine corresponding to one or more memory pages that does not invoke the present invention. Guest swap data 246 may further include location identification data 244 used for linking the guest swap space to the host swap space to reference the content stored in the host swap data 246 without coping the content into the guest swap data 246.

Figure 3:
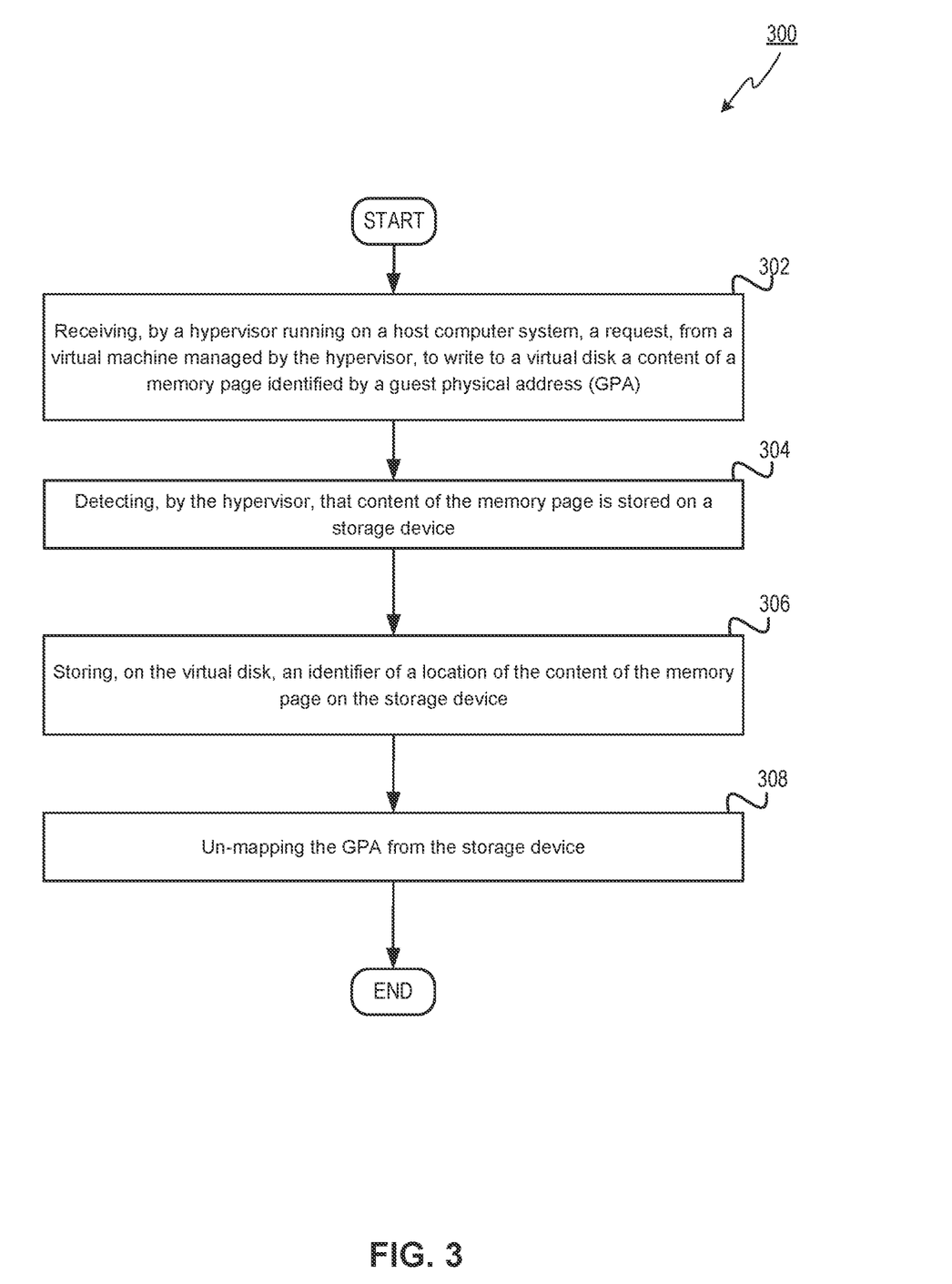
FIG. 3 depicts a flow diagram of an example method for enabling a hypervisor to enhance memory swap efficiency for virtual machines, in accordance with one or more aspects of the present disclosure.
Figure 4:
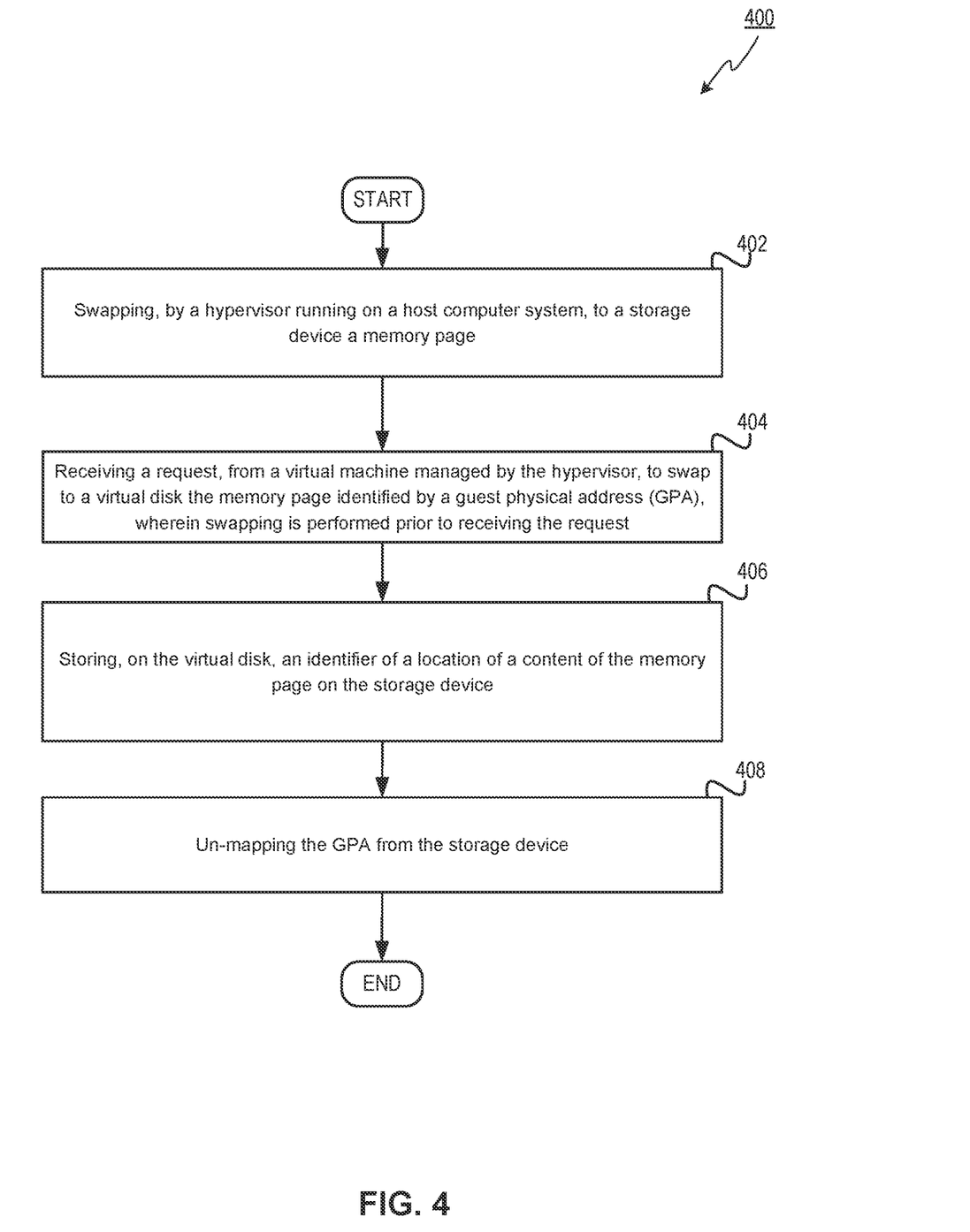
FIG. 4 depicts a flow diagram of another example method for enabling a hypervisor to enhance memory swap efficiency for virtual machines, in accordance with one or more aspects of the present disclosure.

FIGS. 3 and 4 depict flow diagrams for illustrative examples of methods 300 and 400 for, in accordance with one or more aspects of the present disclosure. Methods 300 and 400 illustrate two example process flow from the perspective of the hypervisor. Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computer system 100 as shown in FIG. 1.

Referring now to FIG. 3, method 300 may be performed by processing devices of a server device or a client device. In one implementation, method 300 may be performed by hypervisor 120 of FIGS. 1 and 2 and may begin at block 302.

At block 302, a hypervisor running on a host computer system may receive a request, from a virtual machine managed by the hypervisor, to write to a virtual disk a content of a memory page. The request may include a guest physical address for identifying the memory page and the identification data regarding the virtual disk. The request may include a notification indicating that a memory page is about to be swapped out by the virtual machine and the memory page will not be used by the virtual machine after swapping. In one example, the request may further include the content of the memory page identified by the guest physical address.

At block 304, the hypervisor may detect that content of the memory page is stored on a storage device (e.g., because the memory page has already been swapped out by the host). The hypervisor may determine that the guest physical address is present in a host swap space stored on the storage device that serves as a backing store. In one example, the hypervisor may scan the host swap space and determine whether there is a host physical address corresponding to the guest physical address in a host page table, which indicates the content referenced by the guest physical address has been stored. The hypervisor may identify the location of the storage device corresponding to the host swap space that stores the content referenced by the guest physical address, and store the data as location identification data. In one example, the hypervisor may generate the location identification data upon detecting that the content is stored on the storage device and save the location identification data on the storage device along with the content. For example, the hypervisor may store the location identification data as metadata of the content. In other examples, the location identification data may be stored on any storage devices (including memory) that is accessible by the hypervisor.

At block 306, the hypervisor may store the location identification data (e.g., an identifier of the location of the content of the memory page on the storage device) on the virtual disk, which provides a linkage between the guest swap space and the host swap space regarding the content referenced by the guest physical address. Thus, a subsequent access request for the referenced content in the guest swap space would reference to the referenced content saved in the host swap space, without copying the referenced content in the host swap space to the guest swap space. In one example, the hypervisor may write the location identification data to the guest swap space identified in the request (e.g., by the identification data of the virtual disk in the request).

At block 308, the hypervisor may un-map the guest physical address of the memory page from the storage device so that a subsequent access to the memory page by the virtual machine would result in a page fault, which will be resolved by allocating a new memory page without reading the data from the disk. The un-mapping may involve modifying a page table entry regarding the guest physical address in the host page table. In one example, the hypervisor may send, to the virtual machine that sends the request, a response that the memory page has been swapped, after un-mapping, at block 308, the guest physical address from the storage device. In another example, the hypervisor may send, to the virtual machine that sends the request, a response that the memory page has been swapped, after storing, at block 306, the location identification data on the virtual disk. Responsive to completing the operations described herein above with references to block 308, the method may terminate.

Referring now to FIG. 4, method 400 may be performed by processing devices of a server device or a client device. In one implementation, method 400 may be performed by hypervisor 120 of FIGS. 1 and 2 and may begin at block 402.

At block 402, a hypervisor running on a host computer system may swap to a storage device a memory page, wherein the storage device may represent a backing store corresponding to a host swap space. The hypervisor may have decided to swap the memory page without notifying a virtual machine that is currently assigned to the memory page and write the content of the memory page to the storage device. In one example, the memory page may be identified by a guest physical address, and the content of the memory page may be referenced by the guest physical address.

At block 404, the hypervisor may receive a request, from the virtual machine managed by the hypervisor, to swap to a virtual disk the memory page, wherein swapping at block 402 is performed prior to receiving the request at block 404. In one example, the request may include a guest physical address of the memory page, the identification data regarding the virtual disk, and a notification indicating that a memory page is about to be swapped out by the virtual machine and the memory page is free to use after swapping.

The hypervisor may generate the location identification data that identifies the location of the storage device corresponding to the host swap space that stores the content referenced by the guest physical address (e.g., an identifier of a location of a content of the memory page on the storage device). In one example, the hypervisor may generate the location identification data upon swapping the memory page at block 402 and save it on any storage device. In some instances, the presence of the location identification data may indicate that the memory page has already been swapped by the hypervisor. In another example, the hypervisor may generate the location identification data upon receiving the request at block 404 and detecting that the content of the memory page has already been stored on the storage device. In yet another example, the hypervisor may generate the location identification data upon determining the content referenced in the request has already been stored on the storage device, before, during, or after receiving the request, and save it on any storage device. For example, the hypervisor may save the location identification data as metadata of the content of the memory page.

At block 406, the hypervisor may store, on the virtual disk, the location identification data (e.g., the identifier of the location of the content of the memory page on the storage device). Storing the location identification data on the virtual disk provides a linkage between a guest swap space and a host swap space regarding the content referenced by the guest physical address. The linkage is beneficial in that an access request for the referenced content in the guest swap space would reference to the referenced content saved in the host swap space, without copying the referenced content in the host swap space to the guest swap space. In one example, the hypervisor may write the location identification data to the guest swap space identified in the request (e.g., by the identification data of the virtual disk in the request).

At block 408, the hypervisor may un-map the guest physical address of the memory page from the storage device so that a subsequent access to the memory page by the virtual machine would result in a page fault, which will be resolved by allocating a new memory page without reading the data from the disk. The un-mapping may involve modifying a page table entry regarding the guest physical address in the host page table. In one example, the hypervisor may send, to the virtual machine that sends the request, a response that the memory page has been swapped, after un-mapping, at block 408, the guest physical address from the storage device. In another example, the hypervisor may send, to the virtual machine that sends the request, a response that the memory page has been swapped, after storing, at block 406, the location identification data on the virtual disk. Responsive to completing the operations described herein above with references to block 408, the method may terminate.

Figure 5:
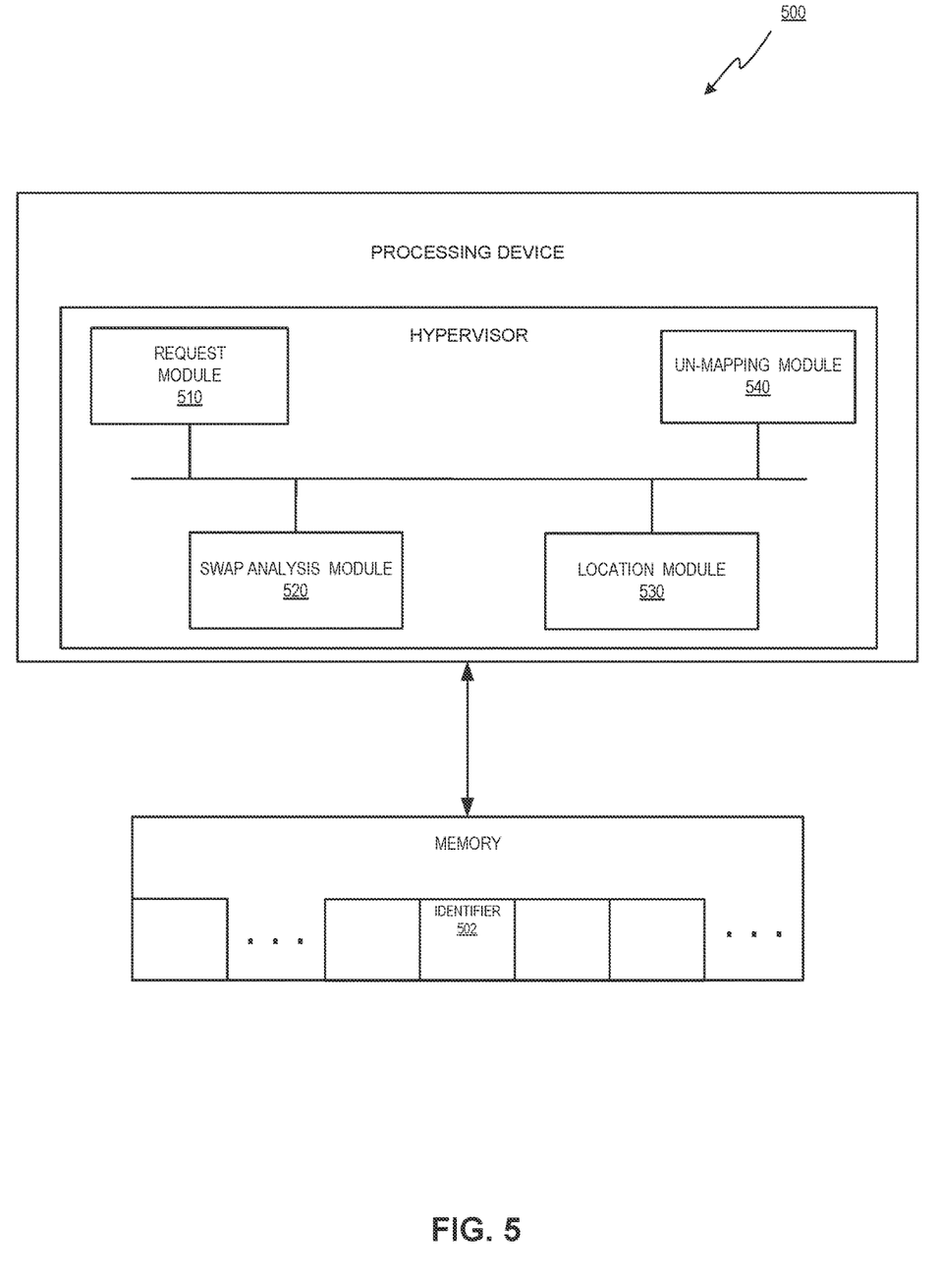
FIG. 5 depicts a block diagram of an example computer system to implement enhanced efficient memory swap for virtual machines, in accordance with one or more aspects of the present disclosure.

FIG. 5 depicts a block diagram of a computer system 500 operating in accordance with one or more aspects of the present disclosure. Computer system 500 may be the same or similar to computing system 100 of FIG. 1 and may include one or more processing devices and one or more memory devices. In the example shown, computer system 500 may include a request module 510, a swap analysis module 520, a location module 530, and an un-mapping module 540.

Request module 510 may enable a processing device executing a hypervisor to receive a request, from a virtual machine managed by the hypervisor, to swap to a virtual disk a memory page. The request may include a guest physical address for identifying the memory page, the identification data regarding the virtual disk, and a notification indicating that a memory page is about to be swapped out by the virtual machine and the memory page is free to use after swapping. In one example, the request may further include the content of the memory page identified by the guest physical address.

Swap analysis module 520 may enable the processing device executing the hypervisor to detect that content of the memory page is stored on a storage device, which indicates that the memory page has already been swapped out by the hypervisor. The hypervisor may analyze whether the guest physical address is present in a host swap space stored on the storage device that serves as a backing store. In one example, the hypervisor may scan the host swap space and determine whether there is a page table entry for the guest physical address in a host page table that indicates the content referenced by the guest physical address has been stored. The hypervisor may identify the location of the storage device corresponding to the host swap space that stores the content referenced by the guest physical address, and store the data as location identification data (e.g., identifier 502). The location identification data may function as a pointer and may include data that identifies a particular location in storage device. The location identification data may indicate one or more locations in the form of numeric values, alphanumeric values, binary values, other values, or a combination thereof. The location identification data may include an identifier, a pointer, a reference, an address, a pointer to a pointer, a reference to a pointer, pointer to a reference, a reference to a reference, other description, or a combination thereof.

In one example, the hypervisor may generate the location identification data upon detecting that the memory page has been swapped to the storage device, before, during, or after receiving the request, and save the location identification data on any storage device. In another example, the hypervisor may generate the location identification data upon receiving the request and save it on the storage device as metadata of the content of the memory page. In yet another example, the hypervisor may generate the location identification data upon swapping, by the hypervisor, the memory page, which is prior to receiving the request, and save it on the storage device along with the content of the memory page. In such cases, the hypervisor may have decided to swap the memory page without notifying a virtual machine that is currently assigned to the memory page and write the content of the memory page to the storage device before the virtual machine's request of swapping the same memory page. For example, the memory page may be identified by a guest physical address, the content of the memory page may be referenced by the guest physical address, and the hypervisor may generate the location identification data of the content being stored.

Location module 530 may enable the processing device executing the hypervisor to store, on the virtual disk, the location identification data (e.g., identifier 502, for example, an identifier of the location of the content of the memory page on the storage device), which provides a linkage between the guest swap space and the host swap space regarding the content referenced by the guest physical address. The linkage is beneficial in that an access request for the referenced content in the guest swap space would reference to the referenced content saved in the host swap space, without copying the referenced content in the host swap space to the guest swap space. In one example, the hypervisor may write the location identification data to the guest swap space identified in the request (e.g., by the identification data of the virtual disk in the request).

Un-mapping module 540 may enable the processing device executing the hypervisor to un-map the guest physical address of the memory page from the storage device so that a subsequent access to the memory page by the virtual machine would result in a page fault, which will be resolved by allocating a new memory page without reading the data from the disk. The un-mapping may involve modifying a page table entry regarding the guest physical address in the host page table. In one example, the hypervisor may send, to the virtual machine that sends the request, a response that the memory page has been swapped, after un-mapping the guest physical address from the storage device. In another example, the hypervisor may send, to the virtual machine that sends the request, a response that the memory page has been swapped, after storing the location identification data on the virtual disk.

Figure 6:
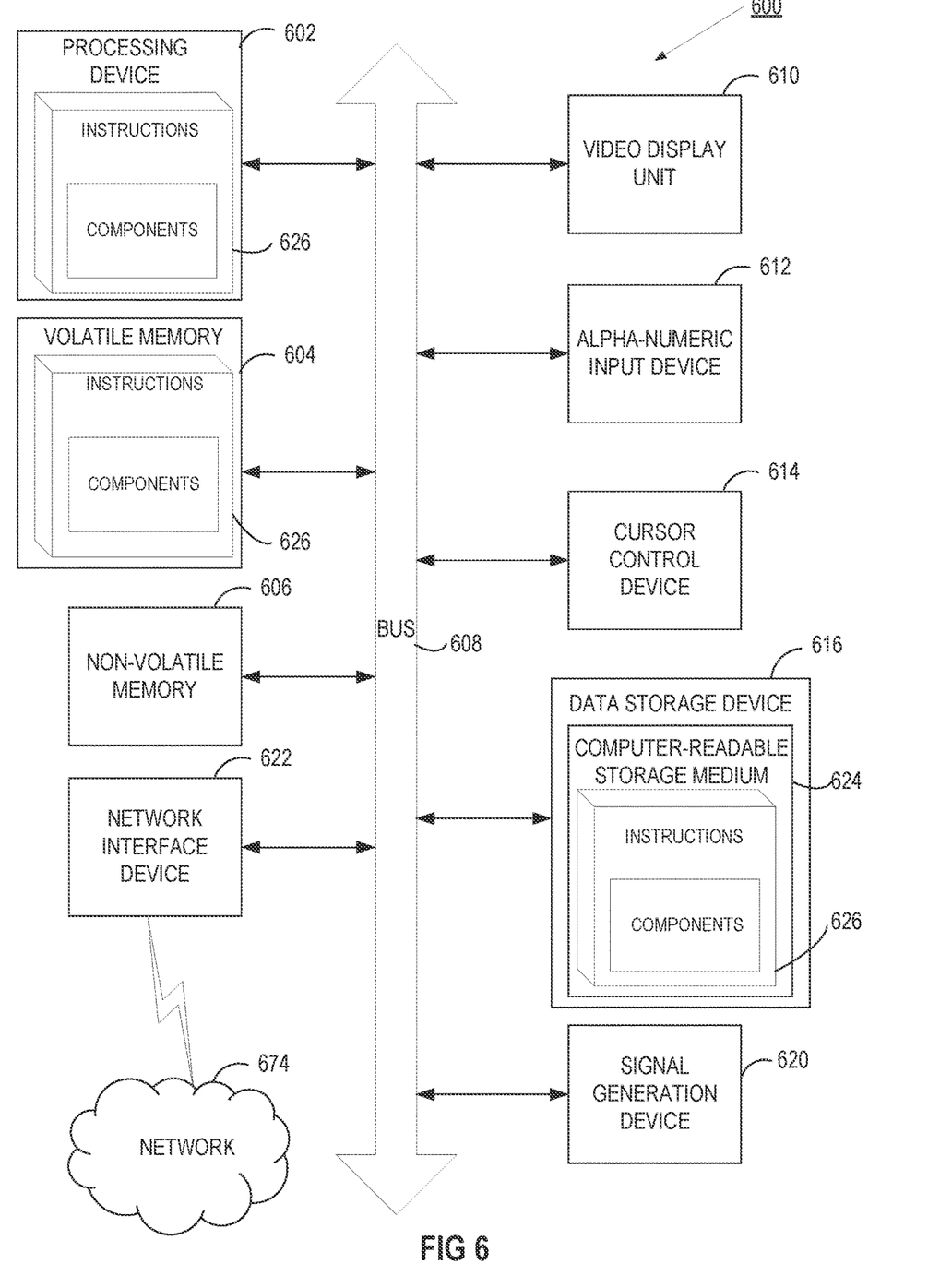
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 400 and for components of FIGS. 1 and 2.

Instructions 626 may also reside, completely or partially, within volatile memory 604 and/or within processing device 602 during execution thereof by computer system 600, hence, volatile memory 604, and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is method comprising: receiving, by a hypervisor running on a host computer system, a request, from a virtual machine managed by the hypervisor, to swap to a virtual disk a memory page identified by a guest physical address (GPA); detecting, by the hypervisor, that a content of the memory page is stored on a storage device; storing, on the virtual disk, an identifier of a location of the content of the memory page on the storage device; and un-mapping the GPA from the storage device.

Example 2 is a method of example 1, wherein the request comprises a notification indicating that the memory page will not be used by the virtual machine after the content being swapped to the virtual disk.

Example 3 is a method of example 2, wherein the notification comprises a binary flag.

Example 4 is a method of example 2, wherein un-mapping the GPA from the storage device is performed responsive to receiving the notification.

Example 5 is a method of example 1, further comprising triggering a fault responsive to an access request to the memory page; and allocating a new memory page without reading the content of the memory page from the storage device.

Example 6 is a method of example 1, wherein detecting that the content of the memory page is stored on the storage device further comprise determining that a memory page identified by a host physical address (HPA) corresponding to the GPA is stored on the storage device.

Example 7 is a method of example 1, wherein the identifier of the location of the content of the memory page on the storage device comprises a pointer to the location of the content of the memory page.

Example 8 is a method of example 1, wherein the identifier of the location of the content of the memory page on the storage device comprises an address of the location of the content of the memory page.

Example 9 is a method of example 1, wherein storing the identifier of the location of the content of the memory page on the storage device further comprises writing the identifier in a file associated with the virtual disk.

Example 10 is a method of example 1, wherein storing the identifier of the location of the content of the memory page on the storage device further comprises writing the identifier in a table entry associated with an identifier of the virtual disk.

Example 11 is a method of example 1, further comprising allocating the memory page for a new use without reading the content of the memory page from the storage device.

Example 12 is a method of example 1, further comprising generating the identifier of the location of the content of the memory page.

Example 13 is a method of example 1, wherein the identifier of the location is generated responsive to storing, on the storage device, the content of the memory page.

Example 14 is a method of example 1, wherein the identifier of the location is generated responsive to detecting that the content of the memory page is stored on the storage device.

Example 15 is a method of example 1, further comprising storing, on the storage device, the identifier of the location of the content of the memory page.

Example 16 is a method of example 1, further comprising sending, to the virtual machine, a response indicating that the memory page has been swapped to the virtual disk.

Example 17 is a method of example 16, wherein the response comprises an indication that the memory page is swapped without reading the content of the memory page from the storage device.

Example 18 is a method of example 1, wherein storing the identifier of the location of the content of the memory page on the storage device is performed responsive to storing, on the storage device, the content of the memory page.

Example 19 is a method of example 1, wherein storing the identifier of the location of the content of the memory page on the storage device is performed responsive to detecting that the content of the memory page is stored on a storage device.

Example 20 is a method of example 1, wherein un-mapping the GPA from the storage device is performed responsive to storing the identifier of the location of the content of the memory page on the storage device.

Example 21 is a system comprising: a memory; and a processing device executing a hypervisor and operatively coupled to the memory, the processing device configured to: detect, by a hypervisor running on a host computer system, that a content of the memory page has been stored in a host disk before receiving a request, from a virtual machine managed by the hypervisor, to swap to a virtual disk the memory page identified by a guest physical address (GPA); store, on the virtual disk, an identifier of a location of the content of the memory page on the host disk; and un-map the GPA from the host disk.

Example 22 is a system of example 21, wherein the request comprises a notification that indicates un-use of the memory page, and un-mapping the GPA from the host disk is performed responsive to receiving the notification.

Example 23 is a system of example 21, wherein the processing device is further configured to: provide a fault responsive to an access request to the memory page; and allocate a new memory page without reading the content of the memory page from the host disk.

Example 24 is a system of example 21, wherein the processing device is further configured to allocate the memory page for a new use without reading the content of the memory page from the storage device.

Example 25 is a system of example 21, wherein the processing device is further configured to determine that a memory page identified by a host physical address (HPA) corresponding to the GPA is stored on the host disk.

Example 26 is a system of example 21, wherein the processing device is further configured to generate the identifier of the location of the content of the memory page as a metadata of the content of the memory page.

Example 27 is a system of example 21, wherein the processing device is further configured to receive the request, from the virtual machine, to swap to the virtual disk the memory page.

Example 28 is a non-transitory machine-readable storage medium storing instructions which, when executed, cause a processing device executing a hypervisor to perform operations comprising: swapping, by a hypervisor running on a host computer system, to a storage device a memory page; receiving, by the hypervisor, a request, from a virtual machine managed by the hypervisor, to swap to a virtual disk the memory page identified by a guest physical address (GPA), wherein swapping is performed prior to receiving the request; storing, on the virtual disk, an identifier of a location of a content of the memory page on the storage device; and un-mapping the GPA from the storage device.

Example 29 is a non-transitory machine-readable storage medium of example 28, wherein the operations further comprise: responsive to swapping, generating the identifier of the location of the content of the memory page on the storage device.

Example 30 is a non-transitory machine-readable storage medium of example 28, wherein the operations further comprise: responsive to receiving the request, determining that the content of the memory page is stored on the storage device.

Example 31 is a non-transitory machine-readable storage medium of example 30, wherein the operations further comprise: responsive to determining that the content of the memory page is stored on the storage device, generating the identifier of the location of the content of the memory page on the storage device.

Example 32 is a non-transitory machine-readable storage medium of example 28, wherein the operations further comprise: providing a fault responsive to an access request to the memory page; and allocating a new memory page without reading the content of the memory page from the host disk.

Example 33 is a method comprising: swapping, by a hypervisor running on a host computer system, to a storage device a memory page; receiving, by the hypervisor, a request, from a virtual machine managed by the hypervisor, to swap to a virtual disk the memory page identified by a guest physical address (GPA), wherein swapping is performed prior to receiving the request; storing, on the virtual disk, an identifier of a location of a content of the memory page on the storage device; and un-mapping the GPA from the storage device.

Example 34 is a method of example 33, further comprising responsive to swapping, generating the identifier of the location of the content of the memory page on the storage device.

Example 35 is a method of example 33, further comprising responsive to receiving the request, determining that the content of the memory page is stored on the storage device.

Example 36 is a method of example 35, further comprising responsive to determining that the content of the memory page is stored on the storage device, generating the identifier of the location of the content of the memory page on the storage device.

Example 37 is a method of example 33, further comprising providing a fault responsive to an access request to the memory page; and allocating a new memory page without reading the content of the memory page from the host disk.

Example 38 is a method of example 33, further comprising sending, to the virtual machine, a response indicating that the memory page has been swapped to the virtual disk without reading the content of the memory page from the storage device.

Example 39 is a device comprising: a means for receiving, by a hypervisor running on a host computer system, a request, from a virtual machine managed by the hypervisor, to swap to a virtual disk a memory page identified by a guest physical address (GPA); a means for detecting, by the hypervisor, that a content of the memory page is stored on a storage device; a means for storing, on the virtual disk, an identifier of a location of the content of the memory page on the storage device; and a means for un-mapping the GPA from the storage device.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400, and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a hypervisor running on a host computer system, a request, from a virtual machine managed by the hypervisor, to write to a virtual disk a content of a memory page identified by a guest physical address (GPA);
   detecting, by the hypervisor, that the content of the memory page is stored on a storage device;
   storing, on the virtual disk, an identifier of a location of the content of the memory page on the storage device; and
   un-mapping the GPA from the storage device responsive to receiving a notification that the memory page will not be used by the virtual machine.

2. The method of claim 1, wherein the request comprises the notification.

3. The method of claim 1, further comprising:
   triggering a fault responsive to an access request to the memory page; and
   allocating a new memory page without reading the content of the memory page from the storage device.

4. The method of claim 1, wherein detecting that the content of the memory page is stored on the storage device further comprises: determining that a memory page identified by a host physical address (HPA) corresponding to the GPA is stored on the storage device.

5. The method of claim 1, further comprising: allocating the memory page for a new use without reading the content of the memory page from the storage device.

6. The method of claim 1, further comprising: generating the identifier of the location of the content of the memory page.

7. The method of claim 1, further comprising: storing, on the storage device, the identifier of the location of the content of the memory page.

8. The method of claim 1, further comprising: sending, to the virtual machine, a response indicating that the memory page has been swapped to the virtual disk.

9. The method of claim 1, wherein un-mapping the memory page from the GPA is performed responsive to storing the identifier of the location of the content of the memory page on the storage device.

10. A system comprising:
    a memory;
    a processing device executing a hypervisor and operatively coupled to the memory, the processing device to:
    detect, by a hypervisor running on a host computer system, that a content of the memory page has been stored in a host disk before receiving a request, from a virtual machine managed by the hypervisor, to swap to a virtual disk the memory page identified by a guest physical address (GPA);
    store, on the virtual disk, an identifier of a location of the content of the memory page on the host disk; and
    un-map the GPA from the host disk responsive to receiving a notification that the memory page will not be used by the virtual machine.

11. The system of claim 10, wherein the request comprises the notification.

12. The method of claim 10, wherein the processing device is further to:

trigger a fault responsive to an access request to the memory page; and allocate a new memory page without reading the content of the memory page from the host disk.

13. The method of claim 10, wherein the processing device is further to determine that a memory page identified by a host physical address (HPA) corresponding to the GPA is stored on the host disk.

14. The system of claim 10, wherein the processing device is further to allocate the memory page for a new use without reading the content of the memory page from the host disk.

15. The system of claim 10, wherein the processing device is further to generate the identifier of the location of the content of the memory page as a metadata of the content of the memory page.

16. A non-transitory machine-readable storage medium storing instructions which, when executed, cause a processing device executing a hypervisor to:

swap, by a hypervisor running on the processing device, to a storage device a memory page;

receive, by the hypervisor, a request, from a virtual machine managed by the hypervisor, to swap to a virtual disk the memory page identified by a guest physical address (GPA), wherein swapping is performed prior to receiving the request;

store, on the virtual disk, an identifier of a location of a content of the memory page on the storage device; and un-map the memory page from the GPA responsive to receiving a notification that the memory page will not be used by the virtual machine.

17. The non-transitory machine-readable storage medium of claim 16, wherein the instructions further cause the processing device to: responsive to swapping, generate the identifier of the location of the content of the memory page on the storage device.

18. The non-transitory machine-readable storage medium of claim 16, wherein the instructions further cause the processing device to: responsive to receiving the request, determine that the content of the memory page is stored on the storage device.

19. The non-transitory machine-readable storage medium of claim 18, wherein the instructions further cause the processing device to: responsive to determining that the content of the memory page is stored on the storage device, generate the identifier of the location of the content of the memory page on the storage device.

20. The non-transitory machine-readable storage medium of claim 16, wherein the instructions further cause the processing device to:

trigger a fault responsive to an access request to the memory page; and allocate a new memory page without reading the content of the memory page from the host disk.

* * * * *